United States Patent [19]

Nishikawa et al.

[11] Patent Number: 4,580,464

[45] Date of Patent: Apr. 8, 1986

[54] DIRECT-COUPLING CONTROL DEVICE FOR A HYDRAULIC TORQUE CONVERTER IN AN AUTOMATIC TRANSMISSION FOR AUTOMOTIVE VEHICLES

[75] Inventors: Masao Nishikawa, Tokyo; Takashi Aoki, Fujimi, both of Japan

[73] Assignee: Honda Giken Kogyo K.K., Tokyo, Japan

[21] Appl. No.: 579,387

[22] Filed: Feb. 13, 1984

[30] Foreign Application Priority Data

Feb. 17, 1983 [JP] Japan .................. 58-25064

[51] Int. Cl.$^4$ .................. F16H 47/00; B60K 41/02
[52] U.S. Cl. .................. 74/731; 192/0.076; 192/3.31
[58] Field of Search ............... 192/0.076, 0.092, 0.096, 192/3.31, 3.58, 3.57, 103 R; 74/868, 869, 867, 731, 732, 733, 645

[56] References Cited

U.S. PATENT DOCUMENTS

| | | | |
|---|---|---|---|
| 3,857,302 | 12/1974 | Morris | 192/3.57 |
| 4,391,166 | 7/1983 | Kubo et al. | 192/3.31 |
| 4,431,096 | 2/1984 | Kobayashi et al. | 192/3.31 |
| 4,448,293 | 5/1984 | Maeda | 192/3.31 |

Primary Examiner—George H. Krizmanich
Attorney, Agent, or Firm—Arthur L. Lessler

[57] ABSTRACT

In an automatic transmission for automotive vehicles, a direct-coupling control device of a hydraulic torque converter is adapted to modulate at a constant rate a signal fluid pressure which is proportional to the vehicle speed, and supply as operating fluid pressure the modulated fluid pressure to a direct-coupling clutch of the torque converter, which locks up an input member and an output member of same. As the fluid pressure signal, a governor pressure is used which has its pressure value amplified at a constant rate and, preferably, with a pressure having a constant value added thereto.

9 Claims, 7 Drawing Figures

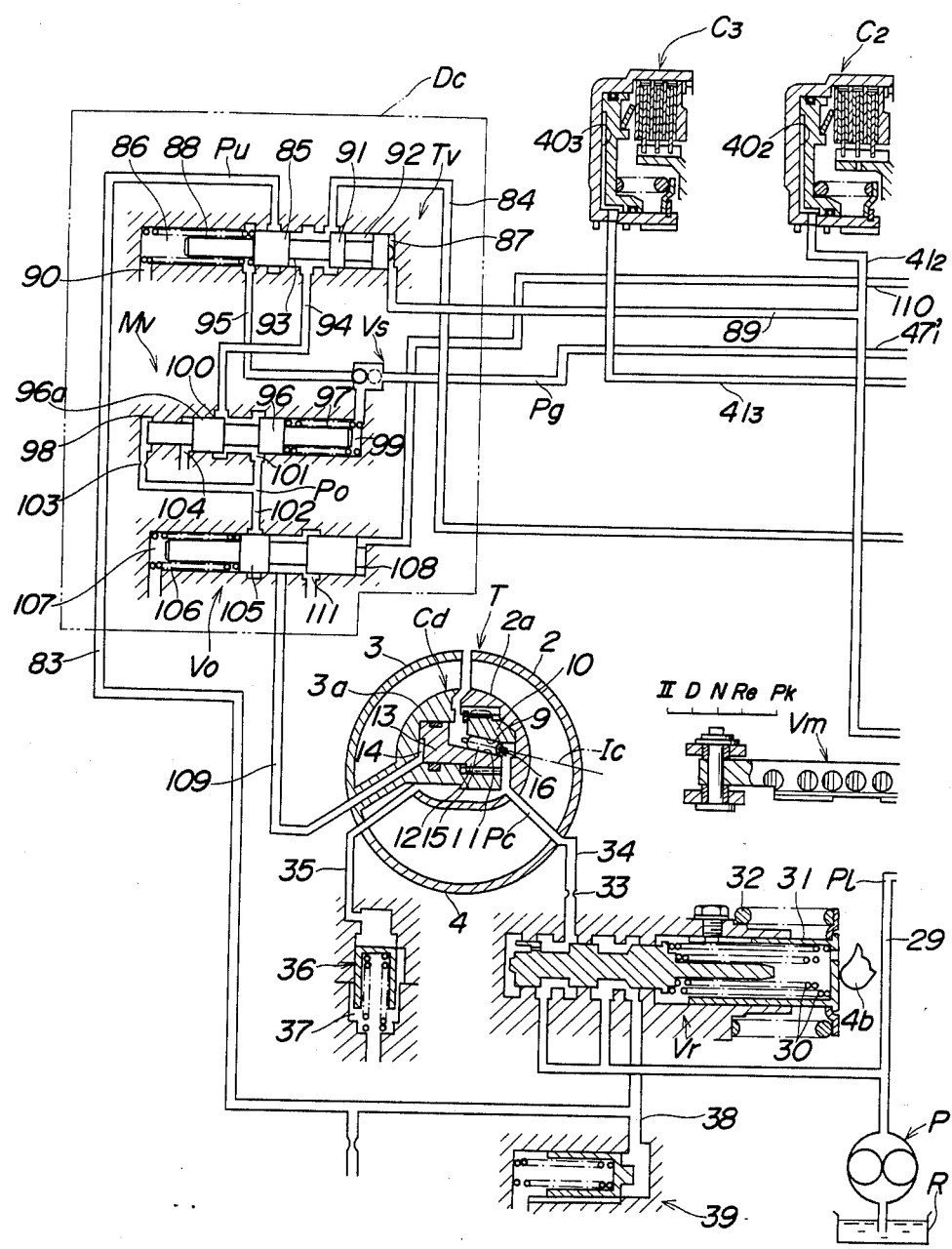
FIG. 2A
FIG. 2
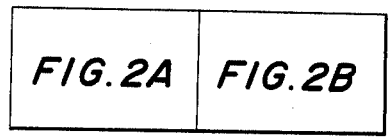

DIRECT-COUPLING CONTROL DEVICE FOR A HYDRAULIC TORQUE CONVERTER IN AN AUTOMATIC TRANSMISSION FOR AUTOMOTIVE VEHICLES

BACKGROUND OF THE INVENTION

This invention relates to a direct-coupling control device for a hydraulic torque converter for use in automatic transmissions for automotive vehicles, and more particularly to a direct-coupling control device of this kind which is adapted to control the operation of a direct-coupling clutch of the hydraulic torque converter on the basis of a parameter indicative of the vehicle speed, for establishing mechanical engagement or locking-up between an input member and an output member of the torque converter.

An automotive vehicle equipped with a hydraulic torque converter can provide a smooth driving characteristic with its speed reduction ratio smoothly changeable, but is inferior to one equipped with a manual transmission in the fuel consumption of the engine due to slippage inherent in the hydraulic torque converter. To eliminate this disadvantage, it is necessary to mechanically lock up the torque converter to reduce the slip loss to a minimum required value when the amplification of torque performed by the torque converter is not required, and desirably the engine speed range for effecting the locking-up of the torque converter should extend to a lowest possible speed. However, if the torque converter is locked up in a very low engine speed region, the phenomenon can occur that the torque amplifying function of the torque converter cannot be utilized when the throttle valve of the engine assumes a large valve opening requiring such function, resulting in degraded power. Further, generally torque fluctuations of the engine are large in a low speed region, and accordingly large vibrations of the engine due to such large torque fluctuations can be directly transmitted to the vehicle body if the torque converter is locked up in such a low speed region, causing discomfort to the driver.

A control device for the torque converter has already been proposed by the assignee of the present application to solve the above problem, which is adapted to increase the engaging force for locking up the direct-coupling clutch in proportion to the vehicle speed, and to apply part of the engine power to the torque converter for torque amplification, in an amount corresponding to a stepping amount of the accelerator pedal while the engine is in a low speed region. In order to increase the engaging force of the direct-coupling clutch in proportion to the vehicle speed, it is advantageous to utilize an output of a governor valve, i.e. a governor pressure, which is usually provided in automatic transmissions for vehicles, since it saves the mounting space and reduces the production cost. However, the performance of engines has recently been improved to have higher output torque. To cope with such increased output torque, in such an improved engine, a certain vehicle speed at which shifting from a lower speed gear to a higher speed gear takes place is set to a higher speed, and accordingly the rate at which the governor pressure is increased with an increase in the vehicle speed is reduced to a smaller value so that the governor pressure can vary also in a higher speed region. This leads to a disadvantage if the governor pressure is used as an engaging force for locking up the direct-coupling clutch. That is, if the engaging force of the direct-coupling clutch is set to such a value as to satisfy power requirements and required vibration level of the engine in low and medium speed regions, the engaging force becomes insufficient in a high speed region, and power can be applied to the torque converter to amplify the torque each time the accelerator pedal is stepped on, thereby deteriorating the fuel consumption of the engine. This is because the governor pressure alone or the sum of the governor pressure and a constant pressure is conventionally used for creating the engaging force of the direct-coupling clutch of the torque converter.

SUMMARY OF THE INVENTION

It is the object of the invention to provide a direct-coupling control device for a hydraulic torque converter for use in automatic transmissions for automotive vehicles, which can impart to the direct-coupling clutch an engaging force which is based upon a signal pressure proportional to the vehicle speed and has such a moderate value as to satisfy power requirements and required vibration level of the engine in low and medium speed regions of the vehicle, and a sufficiently high value in a high vehicle speed region to reduce the fuel consumption of the engine.

The direct-coupling control device according to the invention is applied to an automatic transmission for an automotive vehicle, including: a hydraulic torque converter having an input member and an output member; a hydraulic direct-coupling clutch provided between the input and output members of the torque converter and operable to mechanically engage the same members with each other, the direct-coupling clutch being adapted to apply an engaging force dependent on the magnitude of pressure of operating fluid to the input and output members; an auxiliary transmission coupled to the output member of the torque converter and having a plurality of gear trains for providing different speed reduction ratios; signal pressure generating means for generating a signal fluid pressure proportional to the vehicle speed; and selector means for selecting the gear trains of the auxiliary transmission in response to the signal fluid pressure generated by the signal pressure generating means and at least one parameter indicative of running conditions of the vehicle.

The direct-coupling control device comprises modulator means for modulating at a constant rate the signal fluid pressure generated by the signal pressure generating means, and means for supplying the modulated output pressure from the modulator means to the direct-coupling clutch as the operating fluid pressure. Preferably, the signal pressure generating means is formed of a governor valve, and the modulator means is adapted to amplify at a constant rate a governor pressure supplied from the governor valve as the signal fluid pressure and add a pressure having a constant value to the governor pressure. Further, the modulation of the governor pressure is preferably effected when the signal fluid pressure has a value above a predetermined value.

The above and other objects, features and advantages of the invention will be more apparent from the ensuing detailed description taken in conjunction with the accompanying drawings.

BRIEF DESCRIPTION OF THE DRAWINGS

FIG. 2 shows the manner in which FIGS. 2A and 2B are interconnected;

FIGS 2A, 2B constitute is a circuit diagram illustrating a hydraulic control system of the automatic transmission shown in FIG. 1, in which is incorporated the direct-coupling control device according to one embodiment of the invention;

DETAILED DESCRIPTION

The invention will now be described in detail with reference to the drawings.

Figure 1:
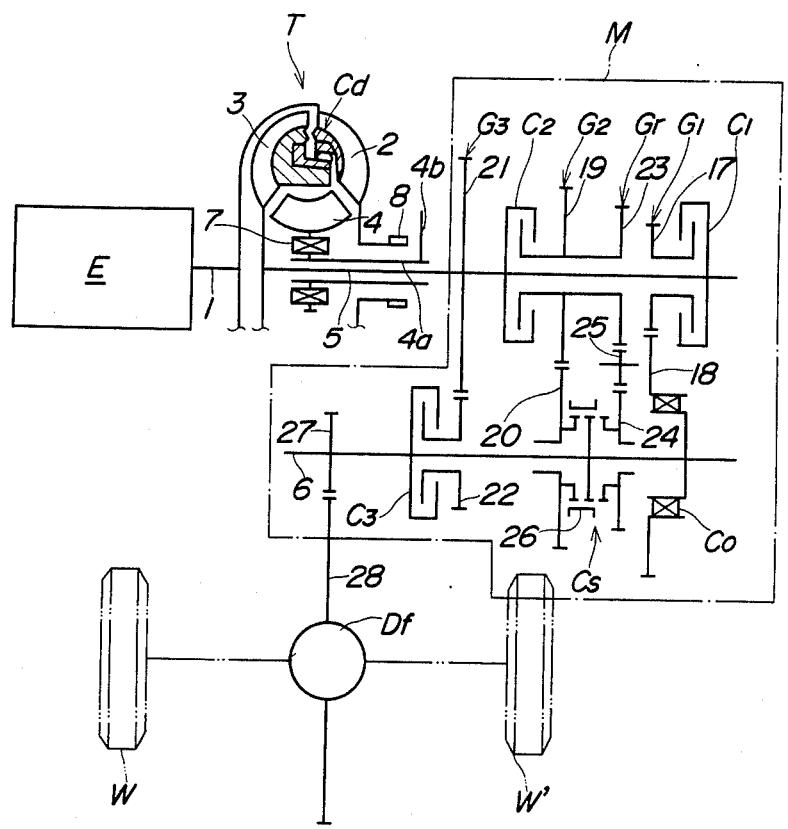
FIG. 1 is a schematic view of an automatic transmission for automotive vehicles, to which the direct-coupling control device of the invention is applied.

FIG. 1 schematically illustrates an automatic transmission for automotive vehicles, having three forward speeds and one reverse speed, to which the invention is applied. Output from an engine E is sequentially transmitted to driving wheels W and W' through a crankshaft 1 of the engine, a hydraulic torque converter T, an auxiliary transmission M and a differential Df.

The torque converter T comprises a pump 2 coupled to the crankshaft 1, a turbine 3 coupled to an input shaft 5 of the auxiliary transmission M, and a stator 4 coupled, via a one-way clutch 7, to a stator shaft 4a which in turn is supported on the input shaft 5 for rotation relative thereto. The crankshaft 1 transmits torque to the pump 2, and then the torque is transmitted from the pump 2 to the turbine 3 in a hydrodynamic manner. When amplification of torque takes place while torque is transmitted from the pump 2 to the turbine 3, the resulting reaction force is borne by the stator 4, as already known.

Figure 2B:
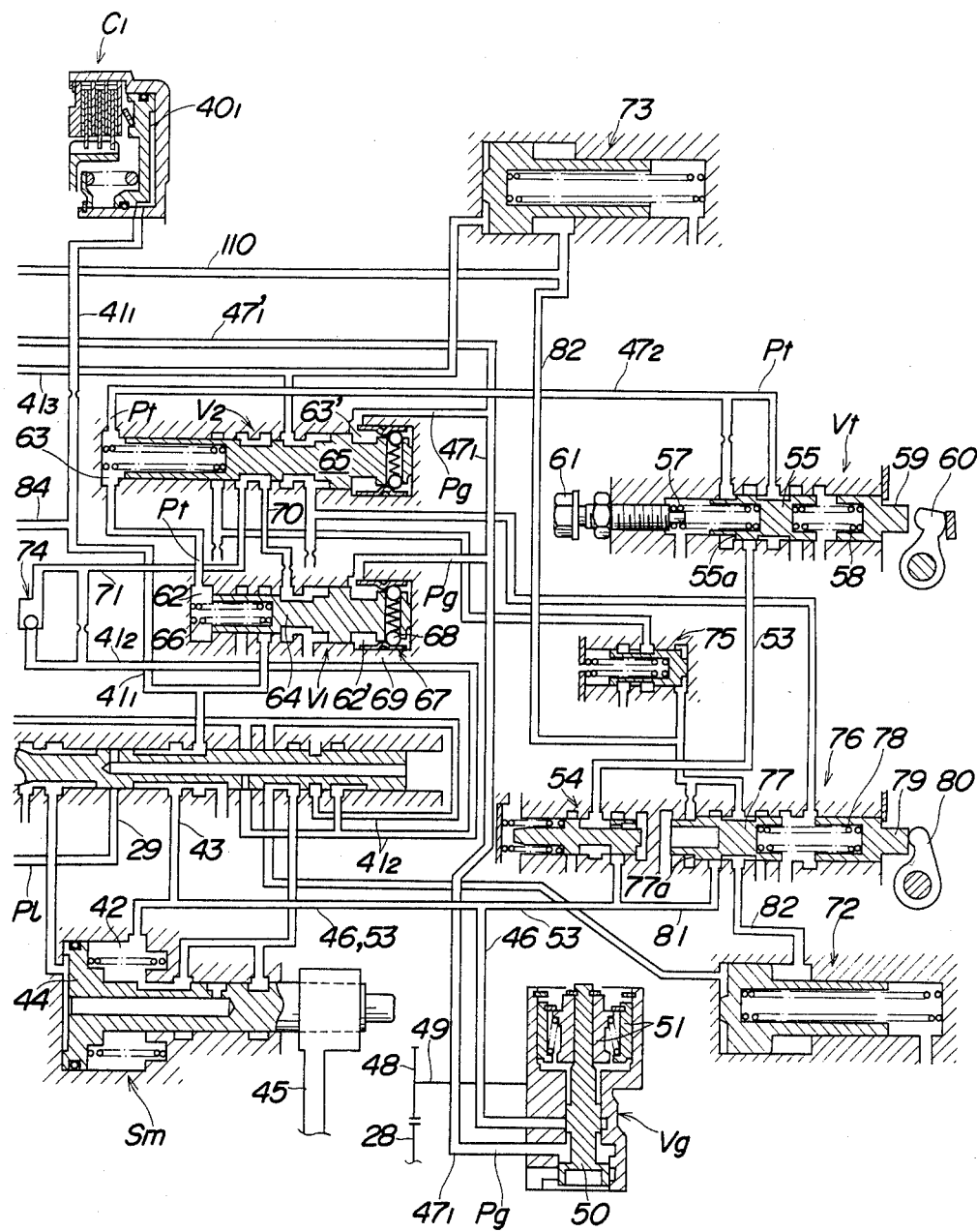

A pump driving gear 8 is arranged on one end of the pump 2, for driving an oil hydraulic pump P appearing in FIG. 2. A stator arm 4b is secured to one end of the stator shaft 4a for controlling a regulator valve Vr also appearing in FIG. 2.

Figure 3:
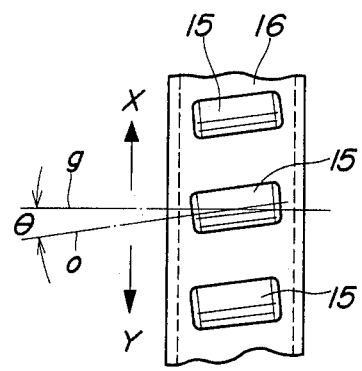
FIG. 3 is a development of essential part of a direct-coupling clutch shown in FIGS. 2A, 2B.

A direct-coupling clutch Cd, which is a roller clutch type, is interposed between the pump 2 and the turbine 3 for mechanically coupling the same members with each other. Referring now to FIGS. 2 and 3 in which the direct-coupling clutch Cd is shown in detail, an annular driving member 10 having a driving conical surface 9 at its inner periphery is secured to an inner peripheral wall 2a of the pump 2, whereas a driven member 12, which has a driven conical surface 11 at its outer periphery extending parallel with the driving conical surface 8, is spline-fitted in an inner peripheral wall 3a of the turbine 3 for axial movement relative thereto. The driven member 12 has its one end formed integrally with a piston 13 which is slidably received within an oil hydraulic cylinder 14 formed in the inner peripheral wall 3a of the turbine 3. The piston 13 receives a pressure in the cylinder 14 and a pressure in the torque converter T at the same time, at its both or left and right end faces, respectively.

Cylindrical clutch rollers 15 are interposed between the driving and driven conical surfaces 9, 11 and retained in place by an annular retainer 16 in a manner such that the clutch rollers 15 each has its axis o inclined by a predetermined angle $\theta$ relative to the generating line g of a virtual conical surface Ic, shown in FIG. 2, which extends between the conical surfaces 9, 11 along the middle thereof, as shown in FIG. 3.

When the torque converter T is not required to amplify the torque transmitted thereto, an oil pressure which is higher than the internal pressure of the torque converter T and supplied into the cylinder 14 causes the piston 13, i.e. the driven member 12, to move toward the driving member 10, whereby the clutch rollers 15 are urgedly held between the conical surfaces 9, 11. With the clutch rollers 15 thus urgedly held between the conical surfaces 9, 11, if output torque from the engine E causes rotation of the driving member 10 in the direction indicated by the arrow X in FIG. 3 relative to the driven member 12, the clutch rollers 15 rotate about their own axes to provide relative axial displacement of the members 10, 12, such that the members 10, 12 approach toward each other due to the rotation of the clutch rollers 15, as the axis of each clutch roller 15 is inclined relative to the generating line g, as described hereinbefore. Consequently, the clutch rollers 15 bitingly engage with the conical surfaces 9, 11 to establish a mechanical coupling between the members 10, 12, i.e. the pump 2 and the turbine 3. On this occasion, if engine output torque exceeding the coupling force of the direct-coupling clutch Cd is applied between the pump 2 and the turbine 3, the clutch rollers 15 can slip on the conical surfaces 9, 11 to divide the engine output torque into two parts, wherein part of the torque is mechanically transmitted through the direct-coupling clutch Cd while the remaining torque is hydrodynamically transmitted from the pump 2 to the turbine 3. Therefore, the ratio between the mechanically transmitted torque and the hydrodynamically transmitted torque is variable dependent on the degree of slipping of the clutch rollers 15.

On the other hand, if a reverse load is applied to the torque converter T during operation of the direct-coupling clutch Cd, the rotational speed of the driven member 12 becomes larger than that of the driving member 10, that is, the driving member 10 rotates in the direction indicated by the arrow Y in FIG. 3 relative to the driven member 12. Consequently, the clutch rollers 15 now rotate in the reverse direction to that mentioned above, to cause relative axial displacement of the members 10, 12 in a manner moving the same members 10, 12 away from each other. Thus, the clutch rollers 15 are released from biting engagement with the conical surfaces 9, 11 to run idle, while the reverse load is transmitted from the turbine 3 to the pump 2 only in a hydrodynamic manner.

When the supply of oil pressure to the cylinder 14 is stopped, the piston 13 is urged by the pressure in the torque converter T into the initial position, thereby rendering the direct-coupling clutch Cd inoperative.

Reverting to FIG. 1, the auxiliary transmission M has an output shaft 6 extending parallel with the input shaft 5, and is provided with a low-speed gear train G1, a medium-speed gear train G2, a high-speed gear train G3 and a reverse gear train Gr, all arranged in juxtaposition between the input and output shafts 5, 6. The low-speed gear train G1 comprises a driving gear 17 connectible to the input shaft 5 through a low-speed clutch C1, and a driven gear 18 connected to the output shaft 6 through a one-way clutch C0 and engaging with the driving gear 17. The medium-speed gear train G2 comprises a driving gear 19 connectible to the input shaft 5 through a medium-speed clutch C2, and a driven gear 20 connectible to the output shaft 6 through a selector clutch Cs and engaging with the driving gear 19, while the high-speed gear train G3 comprises a driving gear 21 secured to the input shaft 5, and a driven gear 22 connectible to the output shaft 6 through a high-speed clutch C3. On the other hand, the reverse gear train Gr comprises a driving gear 23 formed integrally with the driving gear 19 of the middle-speed gear train G2, a driven gear 24 connectible to the output shaft 6 through the selector clutch Cs, and an idle gear 25 engaging with the gears 23, 24. The selector clutch Cs is arranged between the driven gears 20 and 24, and has a selector sleeve 26 which is shiftable between a forward or left position and a reverse or right position in FIG. 1, to selectively connect the driven gear 20 or 24 to the output shaft 6.

If the low-speed clutch C1 alone is engaged when the selector sleeve 26 is held in the forward position as shown in FIG. 1, the driving gear 17 is connected to the input shaft 5 to establish the low-speed gear train G1, thereby transmitting torque from the input shaft 5 to the output shaft 6 therethrough. Then, if the medium-speed clutch C2 is engaged with the low-speed clutch C1 maintained in its engaged state, the driving gear 19 is connected to the input shaft 5 to establish the medium-speed gear train G2 through which torque is transmitted from the input shaft 5 to the output shaft 6. While the medium-speed gear train G2 is thus established, the output shaft 6 rotates faster than the driven gear 18 of the low-speed gear train G1 due to the difference in differential gear ratio between the low-speed and medium-speed gear trains G1, G2, and accordingly the one-way clutch C0 runs idle, rendering the low-speed gear train G1 substantially inoperative. If the medium-speed clutch C2 is disengaged and the high-speed clutch C3 is engaged instead, with the low-speed clutch C1 held in the engaged state, the driven gear 22 is connected to the output shaft 6 to establish the high-speed gear train G3, thereby transmitting torque from the input shaft 5 to the output shaft 6 therethrough. Also on this occasion, the one-way clutch C0 runs idle to render the low-speed gear train G1 substantially inoperative. On the other hand, if the medium-speed clutch C2 alone is engaged while the selector sleeve 26 is shifted to the right or reverse position, the driving gear 23 and the driven gear 24 are connected, respectively, to the input shaft 5 and the output shaft 6 to establish the reverse gear train Gr, thereby transmitting torque from the input shaft 5 to the output shaft 6 through the reverse gear train Gr.

The torque transmitted to the output shaft 6 is then transmitted through an output gear 27 arranged at one end of the output shaft 6 to an enlarged gear 28 of the differential Df.

Referring again to FIG. 2, the hydraulic oil pump P sucks oil from an oil tank R and feeds pressurized oil into an operating fluid line 29. The pressurized oil from the pump P has its pressure regulated to a predetermined value by a regulator valve Vr, and is then supplied to a manual valve Vm. The regulated oil pressure in the fluid line 29 is hereinafter called "the line pressure P1".

The regulator valve Vr has a pressure control spring 30 and a spring-receiving cylinder 31 supporting an outer end of the spring 30 and axially movable for adjusting the setting load of the same spring 30. The cylinder 31 has its outer end face disposed in urging contact with the stator arm 4b so that the reaction force acting upon the stator 4 is applied to the cylinder 31. A stator spring 32 is disposed to urge the cylinder 31 so as to support the reaction force of the stator 4. As the stator spring 32 is compressed with an increase in the reaction force of the stator 4, the cylinder 31 moves leftward in FIG. 2 to increase the setting load of the pressure control spring 30, thereby increasing the line pressure P1 in the operating fluid line 29.

Having been regulated to a predetermined pressure value by the regulator valve Vr, the pressurized oil is in part introduced into the torque converter T through an inlet fluid line 34 provided with a restriction 33, to increase the internal pressure of the torque converter T for prevention of occurrence of cavitation. The internal pressure of the torque converter T is determined by the opening size of the restriction 33, the force of a spring 37 in a check valve 36 arranged in a return fluid line 35 of the torque converter T, etc. The check valve 36 is connected to the oil tank R via an oil cooler, not shown, to return oil to the oil tank R.

A surplus of the pressurized oil delivered from the pump P is fed from the regulator valve Vr to a timing valve Tv and various other parts requiring lubrication via a lubricant oil line 38. A pressure control valve 39 is connected to the lubricant oil line 38 for ensuring a required pressure value of the lubricant oil pressure Pu.

When the manual valve Vm is in the neutral position N as shown in FIG. 2, the pressurized oil delivered thereto is not fed to the clutches C1, C2, C3 or various other parts in the hydraulic system. As the manual valve Vm is shifted leftward to the driving position D from the illustrated position, the operating fluid line 29 extending from the pump P is communicated with an operating fluid line $41_1$ leading to an oil hydraulic cylinder $40_1$ of the low-speed clutch C1, as well as with an operating fluid line 43 leading to a spring chamber 42 of a hydraulic servo motor Sm which is provided for shifting the above-mentioned selector sleeve 26. Accordingly, the low-speed clutch C1 is operated or engaged to establish the low-speed gear train G1 in the manner described before, and a piston 44 of the servo motor Sm is kept in the left position, as viewed in FIG. 2, to hold the selector sleeve 26 in the forward or illustrated position in FIG. 1 through a fork member 45, thereby rendering the reverse gear train Gr inoperative.

An inlet fluid line 46 branches off from the operating fluid line 43 connected to the spring chamber 42 of the servo motor Sm and leads to an input port of a governor valve Vg which acts as signal pressure generating means to generate a signal pressure proportional to the vehicle speed. A first signal fluid line $47_1$ extends from an output port of the governor valve Vg.

The governor valve Vg is disposed to rotate about its own axis 49 through a gear 48 engaging with the enlarged gear 28 of the differential Df. Therefore, the rotational speed of the governor valve Vg is proportional to the vehicle speed. The governor valve Vg supplies the first signal fluid line $47_1$ with an oil pressure proportional to the vehicle speed, i.e. a governor pressure Pg, which is produced by the centrifugal force of two weights 51 of a spool valve body 50 of the governor valve Vg, as already known. Although, in the illustrated embodiment, a governor valve having two weights is employed which has an output pressure characteristic formed by a combination of two quadric parabolas, a governor valve having three weights may alternatively be used, which has an output pressure characteristic formed by a combination of three quadric parabolas. In either case, the output pressure characteristic shows an abrupt change in a low speed region. This abrupt change can be utilized to interrupt the locking-up of the torque converter T when the vehicle speed decreases, thereby omitting the use of a selector valve operable in response to the vehicle speed.

Another inlet fluid line 53 branches off from the operating fluid line 43 and leads to an input of a throttle valve Vt, and a second signal fluid line $47_2$ extends from an output port of the throttle valve Vt. A modulator valve 54 is arranged across the inlet fluid line 53 for regulating the upper limit of the oil pressure at the inlet of the throttle valve Vt.

The throttle valve Vt, which is an already known type, comprises a spool valve body 55, a control spring 58 urging the valve body 55 leftward in FIG. 2, a return spring 57 urging the same valve body 55 rightward, a control piston 59 supporting the control spring 58 at its outer end, a control cam 60 rotatable in response to an increase in the valve opening of a throttle valve of the engine E for causing a leftward movement of the control piston 59, and an adjusting bolt 61 for adjusting the setting load of the return spring 57. As the control piston 59 moves leftward, the same movement causes an increase in the urging force of the control spring 58, thereby causing leftward displacement of the spool valve body 55. On this occasion, the pressurized oil discharged into the second signal fluid line $47_2$ from the throttle valve Vt due to the displacement of the spool valve body 55 acts upon a left shoulder 55a of the same spool valve body 55 in a manner urging the same valve body 55 rightward. As a consequence, an oil pressure proportional to the valve opening of the throttle valve of the engine E is supplied from the throttle valve Vt to the second signal fluid line $47_2$.

The first and second signal fluid lines $47_1$ and $47_2$ are connected, respectively, to pilot pressure chambers 62' and 63' of a low-medium speed shift valve $V_1$ and pilot pressure chambers 62 and 63 of a medium-high speed shift valve V2. The pilot pressure chambers 62, 63; 62', 63' are defined at opposite ends of the respective shift valves V1, V2. Spool valve bodies 64 and 65 of the shift valves V1, V2 are each arranged to receive the governor pressure Pg and the throttle pressure Pt at its opposite end faces, to operate in the following manner:

The spool valve body 64 of the low-medium speed shift valve V1 initially assumes the right position, as shown in FIG. 2, due to the force of a spring 66. As the vehicle speed increases, the governor pressure Pg is increased to urge the spool valve body 64 leftward, and when the governor pressure Pg exceeds the combined force of the spring 66 and the throttle pressure Pt acting upon the valve body 64 to urge same rightward, a ball 68 of a click motion means 67 arranged at the right end of the valve body 64 moves leftward over a fixed locating protuberance 69, to cause the valve body 64 to promptly assume its left position. Consequently, in addition to the supply of oil pressure from the pump P to the cylinder $40_1$ of the low-speed clutch C1, the cylinder $40_2$ of the medium-speed clutch C2 is also supplied with an oil pressure through operating fluid lines 70, 71 and $41_2$ to become engaged, thereby establishing the medium-speed gear train G2. As mentioned hereinbefore, the medium-speed gear train G2 alone substantially functions when both the clutches C1, C2 are engaged.

As the vehicle speed further increases, the medium-high speed shift valve V2 operates in the same manner as the shift valve V1, that is, the spool valve body 65 moves leftward due to the increased governor pressure Pg, to thereby establish a communication between the operating fluid lines $41_2$, 71 and the oil tank R as well as a communication between the operating fluid line 70 and an operating fluid line $41_3$ leading to a hydraulic pressure cylinder $40_3$ of the high-speed clutch C3. Accordingly, the medium-speed clutch C2 becomes disengaged, and the low-speed and high-speed clutches C1, C3 become engaged, thereby establishing the high-speed gear train G3 in the aforementioned manner.

Accumulators 72 and 73, a one-way valve 74, an orifice control valve 75, etc. are provided for relieving shocks caused by the above shifting or gear-changing operations. Since these members are not essentially concerned with the invention, explanation of which is omitted.

A valve 76 is arranged between an operating fluid line 81 branching off from the inlet fluid line 53 and an operating fluid line 82 connected to back pressure chambers of the accumulators 72, 73. The valve 76 has a construction similar to that of the aforementioned throttle valve Vt, and comprises a spool valve body 77, a control spring 78 urging the valve body 77 leftward in FIG. 2, a control piston 79 supporting the control spring 78 at its outer end, and a control cam 80 rotatable in response to an increase in the valve opening of the throttle valve of the engine E for displacing the control piston 79 leftward. A leftward movement of the control piston 79 is transmitted to the spool valve body 77 through the control spring 78 to cause same to move leftward. On this occasion, the oil pressure discharged into the operating fluid line 82 from the valve 76 due to the leftward movement acts upon a left shoulder 77a of the spool valve body 77 in a manner urging the valve body 77 rightward. In this manner, the valve 76 supplies the fluid line 82 with an oil pressure proportional to the valve opening of the throttle valve of the engine E, for relieving shocks caused by the shifting or gear-changing operations.

When the manual valve Vm is in a position other than the driving position D, for instance, a medium-speed keeping position II or a reverse position Re, the medium-speed clutch C2 alone operates to establish the medium-speed gear train G2 or the reverse gear train Gr. When the manual valve Vm is thus shifted to the reverse position Re, an oil pressure is applied to the left end face of the piston 44 of the servo motor Sm and simultaneously the spring chamber 42 is connected to the oil tank R, to thereby displace the piston 44 rightward to establish the reverse gear train Gr. Incidentally, in FIG. 2, the symbol Pk on the manual valve Vm denotes a parking position of the same valve.

The hydraulic circuit described above is substantially identical with a conventional type.

A control device Dc for the direct-coupling clutch Cd according to the invention will now be described with reference to FIG. 2. The control device Dc is essentially provided with a modulator valve Mv which acts as modulator means to control the engaging force of the direct-coupling clutch Cd in response to the vehicle speed when the direct-coupling is established. An on-off valve Vo is arranged between the modulator valve Mv and the direct-coupling clutch Cd. Connected to the direct-coupling clutch Cd are a fluid line 83 which branches off from the fluid line 38 extending from the regulator valve Vr and supplies the lubricant oil pressure Pu to the direct-coupling clutch Cd, and a fluid line 84 branching off from the operating fluid line $41_1$ connected to the cylinder $40_1$ of the low-speed clutch C1. A timing valve Tv is arranged between the modulator valve Mv and the fluid lines 83, 84. Although, in the illustrated embodiment, the timing valve Tv, the modulator valve Mv and the on-off valve Vo are serially connected with each other in the order mentioned, they may be arranged in any other order so far as the valves Tv, Mv, Vo are hydraulically connected in series with each other.

The timing valve Tv serves to temporarily interrupt the locking-up of the direct-coupling clutch Cd during a shifting operation when there occurs a changeover between the transmission gears. The timing valve Tv comprises a spool valve body 85 movable between a first or right position and a second or left position, a first pilot pressure chamber 86 defined at the left end of the valve body 85, a second pilot pressure chamber 87 defined at the right end of the valve body 85, and a spring 88 urging the valve body rightward. The second pilot pressure chamber 87 is connected with a fluid line 89 branching off from the operating fluid line $41_2$ connected to the medium-speed clutch C2, while the first pilot pressure chamber 86 is connected to the oil tank R via a fluid line 90. The valve body 85 has its outer periphery formed with a land 91 and annular grooves 92 and 93 arranged at opposite sides of the land 91. When the valve body 85 is in the first position as shown in FIG. 2, the fluid line 84 is communicated with an output fluid line 94 connected to the modulator valve Mv. This communication between the fluid lines 84 and 94 is also established when the valve body 85 is in the left or second position. However, while the valve body 85 is on the way from the first position to the second position or vice versa, the output fluid line 94 is temporarily disconnected from the fluid line 84 and communicated with the fluid line 83 alone.

More specifically, when the valve body 85 moves from the first or illustrated position to the second position, first, the fluid line 84 is closed by the land 91 and the communication between the output fluid line 94 and the fluid line 83 is established. Then, the output fluid line 94 is closed by the land 91, and the communication between the fluid lines 94, 84 is again established as the land 91 further moves leftward. On the contrary, when the valve body 85 moves rightward from the second position to the first position, the output fluid line 94 is closed by the land 91 and then communicated with the fluid line 83, and thereafter closing of the fluid line 83 takes place, followed by communication between the fluid lines 94 and 84.

A fluid line 95 is communicated with the oil tank R via the first pilot pressure chamber 86 and the fluid line 90 when the valve body 85 is in the illustrated position. However, during the time the medium-speed clutch C2 is engaged, the valve body 85 is biased leftward to keep the fluid line 95 communicated with the fluid line 83, while disconnecting same from the oil tank R.

The modulator valve Mv serves to produce an engaging force for locking up the direct-coupling clutch Cd mainly from the governor pressure Pg, and forms essential part of the invention. The modulator valve Mv comprises a spool valve body 96 movable between a closed or right position and an opened or left position, a spring 97 urging the spool valve body 96 toward the opened position, a first pilot pressure chamber 98 defined at the left end of the valve body 96, a second pilot pressure chamber 99 defined at the right end of the valve body 96 and accommodating the spring 97, an input port 100 and an output port 101. The input port 100 is connected to the output fluid line 94 of the timing valve Tv, while the output port 101 is connected to a fluid line 102. The first pilot pressure chamber 98 is communicated with the fluid line 102, i.e. the output port 101, through a restriction 103. One end portion of the valve body 96 facing the first pilot pressure chamber 98 has an outer diameter smaller than those of the remaining portions. An oil chamber 104 defined at a left shoulder $96a$ of the valve body 96 is communicated with the oil tank R.

The second pilot pressure chamber 99 is connected, through a high selector valve Vs, to the fluid line 95 and a fluid line $47_1'$ branching off from the first signal fluid line $47_1$ leading from the governor valve Vg. The high selector valve Vs serves to compare the oil pressure in the fluid line $47_1'$, i.e. the governor pressure Pg with the oil pressure in the fluid line 95, i.e. the lubricant oil pressure Pu, or with a pressure having a value of zero. One of the above oil pressures having a higher pressure value is introduced into the second pilot pressure chamber 99 through the high selector valve Vs.

The on-off valve Vo serves to interrupt the locking-up of the direct-coupling clutch Cd when the throttle valve of the engine E is in its idle position. The on-off valve Vo comprises a spool valve body 105 movable between a closed or right position for interrupting the locking-up of the direct-coupling clutch Cd and an opened or left position, a spring 106 urging the valve body 105 toward the closed position, a first pilot pressure chamber 107 defined at the left end of the valve body 105, and a second pilot pressure chamber 108 defined at the right end of the valve body 105. The on-off valve Vo has its input port communicated with the fluid line 102 extending from the modulator valve Mv, while its output port is communicated with the interior of the oil hydraulic cylinder 14 of the direct-coupling clutch Cd. The second pilot pressure chamber 108 is connected with a fluid line 110 branching off from the fluid line 82 which extends from the valve 76 and leads to the back pressure chambers of the accumulators 72, 73 for supplying same with an oil pressure proportional to the valve opening of the throttle valve of the engine E, whereas the first pilot pressure chamber 107 is communicated with the oil tank R.

The on-off valve Vo is opened when the output pressure of the valve 76, i.e. the oil pressure proportional to the valve opening of the throttle valve of the engine E, exceeds the force of the spring 106, to thereby introduce the output pressure of the modulator valve Mv into the oil hydraulic cylinder 14 of the direct-coupling clutch Cd. On the other hand, when the output pressure of the valve 76 is smaller than the force of the spring 106, the on-off valve Vo is closed to cause the fluid line 109 to be communicated with a relief port 111, thereby allowing the oil pressure in the hydraulic cylinder 14 to drain to the oil tank R.

Although in the illustrated embodiment the second pilot pressure chamber 108 of the on-off valve Vo is arranged to be supplied with the oil pressure from the valve 76 which is provided for relieving shocks caused by the gear shifting operations, the throttle pressure Pt from the throttle valve Vt may alternatively be applied to the same pilot pressure chamber 108.

Next, the operation of the control device Dc according to this embodiment will be described. The control device Dc of the direct-coupling clutch Cd is rendered operative only when the manual valve Vm is in the driving position D. Therefore, the following explanation is based on the assumption that the manual valve Vm is set in the driving position D.

When the vehicle is running at a low or high speed, the oil pressure in the fluid line 89 has a value of zero since no operating oil is then supplied to the medium-speed clutch C2. Consequently, the timing valve Tv assumes the first position as shown in FIG. 2, and the high selector valve Vs is held in a position shown by the solid line in FIG. 2, to allow the governor pressure Pg to be supplied to the second pilot pressure chamber 99 of the modulator valve Mv. The governor pressure Pg cooperates with the spring 97 to urge the spool valve body 96 toward its opened position. On this occasion, the valve body 96 is also urged toward its closed position by the output pressure of the same modulator valve Mv, which is supplied to the first pilot pressure chamber 98 through the output port 101 and the restriction 103 and acts upon the left end face of the valve body 96. However, the pressures acting upon the opposite end faces of the valve body 96 do not equilibrated until the oil pressure urging the valve body 96 toward the closed position exceeds the governor pressure Pg, since the pressure-receiving surface area SL of the valve body 96 facing the first pilot pressure chamber 98 is smaller than the pressure-receiving surface area SR of same facing the second pilot pressure chamber 99 by an amount corresponding to the left end face area of the shoulder 96a.

When the pressures acting upon the opposite end faces of the valve body 96 are in an equilibrium, the following equation (1) stands provided that Fo represents the urging force of the spring 97, and Po represents output pressure in the output port 101:

$$Po \times SL = Pg \times SR + Fo \quad (1)$$

The equation (1) can be rearranged as follows:

$$Po = SR/SL \times Pg + Fo/SL \quad (2)$$

Since the relationship SR/SL>1 stands as stated above, it will be clear from the equation (2) that the output pressure Po is a proportional function of the governor pressure Pg and its value is equal to the sum of a value obtained by amplifying a governor pressure Pg value at a constant rate determined by SR/SL, and a constant value Fo/SL.

Figure 4:
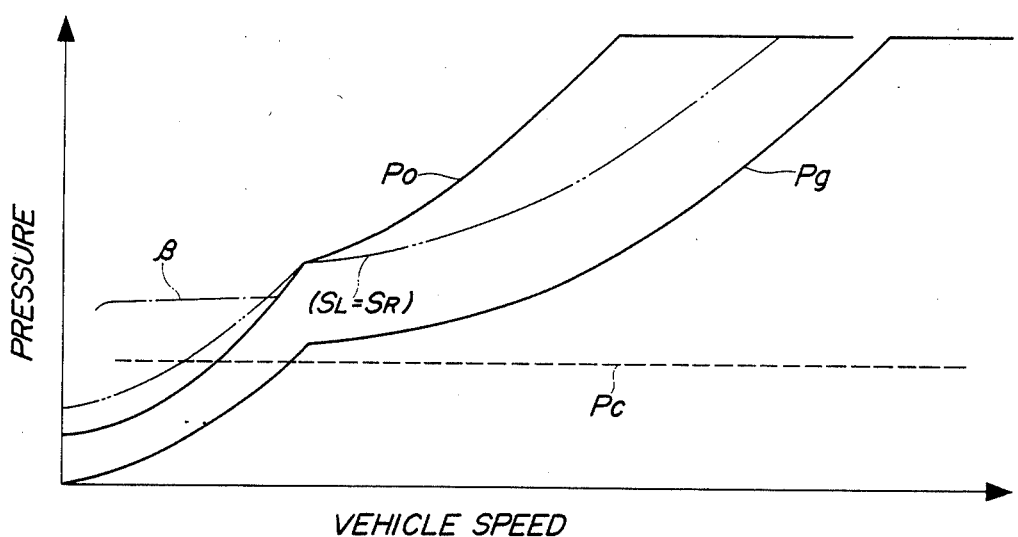
FIG. 4 is a graph showing an output oil pressure characteristic of a modulator valve in FIGS. 2A, 2B.

This will be further explained with reference to FIG. 4. As shown in FIG. 4, the output pressure Po of the modulator valve Mv according to the invention assumes higher values in a high speed vehicle region, as compared with a characteristic curve of a conventional torque converter indicated by the two-dot chain line in FIG. 4, in which the output pressure is increased in a manner parallel with the increasing governor pressure Pg, based upon the relationship SL=SR. Therefore, according to the invention, even if the engaging force of the direct-coupling clutch Cd is set to such a value as to satisfy power requirements and required vibration level of the engine in low and medium speed regions, a sufficiently high engaging force can be obtained in high speed regions where such requirements can easily be satisfied, thereby improving the fuel consumption of the engine.

Incidentally, the symbol Pc in FIG. 4 represents internal pressure of the torque converter T. The engaging force of the direct-coupling clutch Cd is produced as a function of the difference between the output pressure Po and the internal pressure Pc.

On the other hand, when the vehicle is running with the medium-speed gear established, the oil pressure being supplied to the medium-speed clutch C2 is also introduced into the second pilot pressure chamber 87 of the timing valve Tv to move the valve body 85 to the second position, so that the lubricant oil pressure Pu is supplied to the fluid line 95. Accordingly, when the governor pressure Pg is lower than the lubricant oil pressure Pu in a low speed region, the output pressure Po shows a characteristic curve shown by the one-dot chain line β in FIG. 4. The difference (β−Po) determines the engaging force of the direct-coupling clutch Cd. Even with this arrangement, even if the engaging force of the direct-coupling clutch Cd is set to a smaller value in a middle speed region, the same force can have a sufficiently high value in a high vehicle speed region.

Although in the above embodiment the spool valve body 96 of the modulator valve Mv is configurated such that its left end face is disposed to face the first pilot pressure chamber 98 connected to the output port 101 while the shoulder 96a faces the oil chamber 104 connected to the oil tank R, the modulator valve Mv may alternatively be constructed such that the shoulder 96a faces a pilot pressure chamber connected to the output port 101 while the left end face of the valve body 96 faces an oil chamber connected to the oil tank R.

Figure 5:
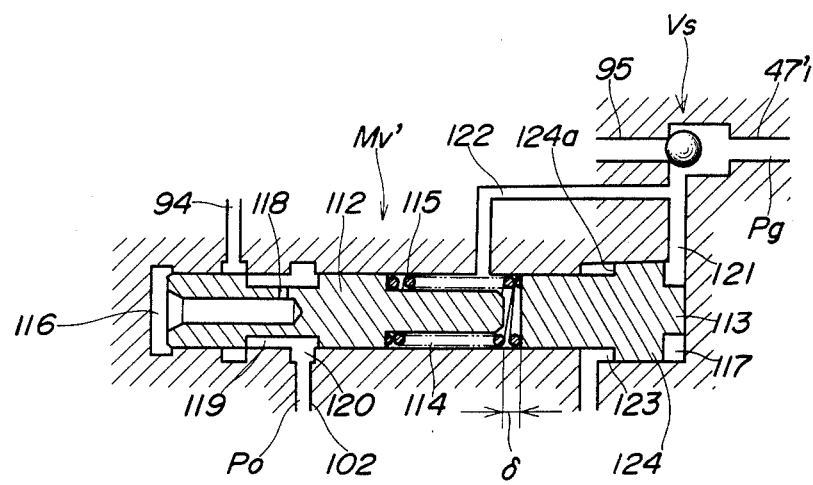
FIG. 5 is a schematic sectional view of a modulator valve forming essential part of the direct-coupling control device according to another embodiment of the invention.

FIG. 5 shows a modulator valve according to another embodiment of the invention. The modulator valve Mv′ comprises a spool valve body 112 movable between a closed or right position and an opened or left position, a piston 113 arranged at the right end of the valve body 112 concentrically therewith and axially movable and having an enlarged shoulder 124 larger in outer diameter than the valve body 112, a spring 115 accommodated within a spring chamber 114 defined between the valve body 112 and the piston 113 and urging the valve body 112 and the piston 113 in directions away from each other, a first pilot pressure chamber 116 defined at the left end of the valve body 112, and a second pilot pressure chamber 117 defined at the right end of the piston 113. The total pressure-receiving area of the left end face of the valve body 112 is smaller than that of the right end face of the piston 113 by a predetermined amount. The first pilot pressure chamber 116 is communicated with an annular groove 119 formed in the outer periphery of the valve body 112, via a restriction 118 formed within the valve body 112. The annular groove 119 is communicated with the output port 120. The second pilot pressure chamber 117 is connected to the high selector valve Vs through a fluid line 121, while the spring chamber 114 is connected to the same selector valve Vs through a fluid line 122. A left shoulder 124a of the piston 113 faces an oil chamber 123 which is communicated with the oil tank R. The other parts of the modulator valve Mv′ and its related parts, not referred to above, are identical in structure with the corresponding ones in the embodiment in FIG. 2.

The modulator valve Mv′ constructed as above operates as follows: When the high selector valve Vs is in the illustrated position, the governor pressure Pg is supplied to the second pilot pressure chamber 117 as well as to the spring pressure chamber 114. Although the piston 113 is urged leftward by a force which has a value equal to the product of the governor pressure Pg and the pressure-receiving surface area of the shoulder 124, the piston 113 remains unmoved until the above leftward force exceeds the force of the spring 115. On this occasion, the valve body 112 receives the governor pressure Pg and the output pressure Po at its right and left end faces, respectively, so that the output pressure Po which has a value equal to the sum of the governor pressure Pg and a constant pressure value is outputted through the output port 120 of the modulator valve Mv'.

Figure 6:
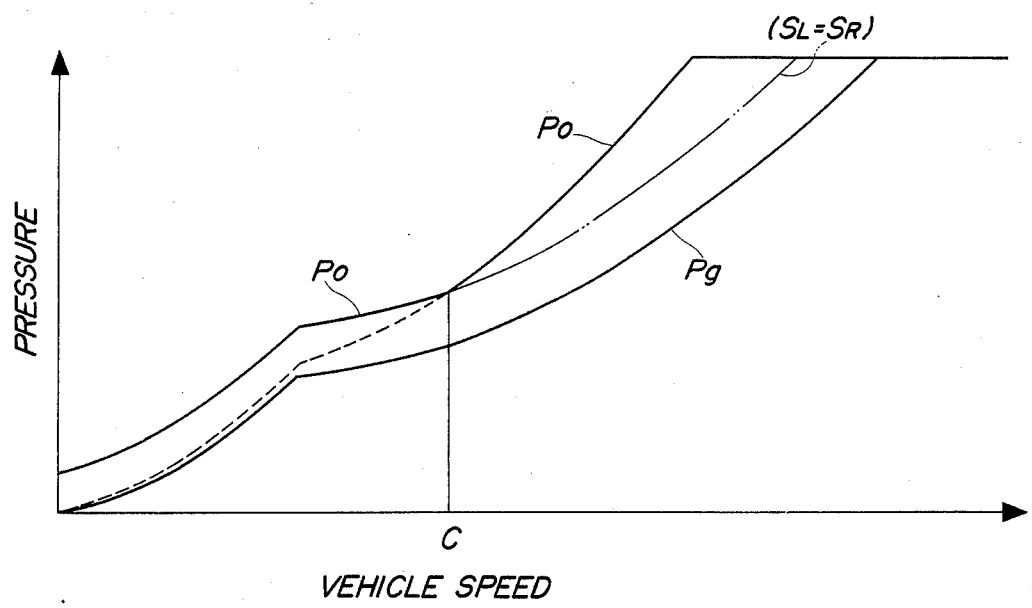
FIG. 6 is a graph showing an output oil pressure characteristic of the modulator valve in FIG. 5.

As the governor pressure Pg increases with an increase in the vehicle speed so as to increase the force urging the piston 113 leftward above the force of the spring 115, the piston 113 moves leftward by a distance δ to abut against the valve body 112, and thereafter the piston 113 moves in unison with the valve body 112 as the vehicle speed further increases. Accordingly, in the same manner as the modulator valve Mv in FIG. 2, a difference is produced between the pressure-receiving surface area of the valve body 112 facing the first pilot pressure chamber 116 and that of the piston 113 facing the second pilot pressure chamber 117, and thereafter the output characteristic of the output pressure Po is determined by amplifying a governor pressure Pg value at a constant rate, as shown in FIG. 6. In FIG. 6, the output pressure Po increases at a relatively gentle slope until the vehicle speed reaches a medium speed region, and once the vehicle speed exceeds a certain speed shown by the point C in FIG. 6, the output pressure Po starts to increase at a sharp slope. This characteristic of the output pressure Po is particularly advantageous for a vehicle in which a resonance can occur in a middle speed region, depending upon the rigidity of the vehicle frame. By thus slightly reducing the engaging force of the direct-coupling clutch Cd in the middle speed region, noise caused by such resonance can be avoided.

One may insist that a similar result to that achieved by the control device Dc in FIGS. 1 to 3 in particular can be obtained by increasing the effective surface area of the piston 13 of the direct-coupling clutch Cd. However, it is difficult to enlarge the effective surface area of the piston 13, due to a limited space for the piston 13. Even if it is possible, the engaging force for the direct-coupling clutch can become excessively strong in a maximum speed region, deteriorating the effective life of the system.

As described above, the direct-coupling control device for the torque converter according to the invention is adapted to modulate a signal pressure proportional to the vehicle speed at a constant rate by modulator means, and adopt the output pressure of the modulator means as a source for creating the engaging force of the direct-coupling clutch which has sufficiently high values in a high vehicle speed region. Therefore, even if the engaging force of the direct-coupling clutch is set at such a value as to satisfy power requirements and required vibration level of the engine in low and medium speed regions, a sufficiently high engaging force of the clutch can be obtained in a high speed region, thereby improving the fuel consumption of the engine.

What is claimed is:

1. In an automatic transmission for use in an automotive vehicle, including a hydraulic torque converter having an input member and an output member, a hydraulic direct-coupling clutch arranged between said input member and said output member and operable to mechanically engage same with each other, said direct-coupling clutch being adapted to apply an engaging force dependent on the magnitude of pressure of operating fluid to said input member and said output member, an auxiliary transmission connected to said output member of said torque converter and having a plurality of gear trains for providing different transmission gear ratios, signal pressure generating means for generating a signal fluid pressure proportional to the speed of said automotive vehicle, and selector means for selecting said gear trains of said auxiliaray transmission in response to said signal fluid pressure generated by said signal pressure generating means and at least one parameter indicative of running conditions of said automotive vehicle, a direct-coupling control device comprising: modulator means for modulating at a constant rate said signal fluid pressure generated by said signal pressure generating means to produce a modulated output pressure which becomes larger than the signal fluid pressure by an amount increasing as the vehicle speed increases and means for supplying a modulated output pressure from said modulator means to said direct-coupling clutch as said operating fluid pressure.

2. A direct-coupling control device as claimed in claim 1, wherein said modulator means is adapted to modulate said signal fluid pressure at a constant rate when said signal fluid pressure has a value above a predetermined value.

3. A direct-coupling control device as claimed in claim 1 or 2, wherein said signal pressure generating means comprises a governor valve, said modulator means being adapted to amplify at a constant rate multiplied by a constant valve a governor pressure from said governor valve as said signal fluid pressure.

4. A direct-coupling control device as claimed in claim 3, wherein said modulator means is adapted to add a pressure having a constant value to a value of said governor pressure obtained by amplifying said governor pressure at a constant rate.

5. A direct-coupling control device as claimed in claim 4, wherein said modulator means comprises an input port for introducing operating fluid having a high pressure value, an output port, a spool valve body movable between a closed position and an opened position, a spring urging said spool valve body toward said opened position, a first oil pressure chamber disposed to be supplied with a first pilot oil pressure for urging said spool valve body toward said closed position, a second oil pressure chamber disposed to be supplied with a second pilot oil pressure formed at least of said governor pressure for urging said spool valve body and said spring toward said opend position, and restriction means communicating said output port with said first oil pressure chamber, said spool valve body having a first pressure-receiving surface area facing said first oil pressure chamber and a second pressure-receiving surface area facing said second oil pressure chamber, said first pressure-receiving surface area being smaller than said second pressure-receiving surface area by a predetermined amount.

6. A direct-coupling control device as claimed in claim 4, wherein said modulator means comprises an input port for introducing operating fluid having a high pressure value, an output port, a spool valve body movable between a closed position and an opened position, a piston arranged at one end of said spool valve body concentrically therewith and axially movable for urging contact with said one end of said spool valve body, a spring chamber defined between said spool valve body and said piston and disposed to be supplied with an oil pressure formed at least of said governor pressure, a spring accommodated within said spring chamber and urging said spool valve body and said piston in directions away from each other, a first oil pressure chamber disposed to be supplied with a first pilot oil pressure for urging said spool valve body toward said closed position, a second oil pressure chamber disposed to be supplied with a second pilot oil pressure formed at least of said governor pressure for urging said piston toward or against said spool valve body against the force of said spring, and restriction means communicating said output port with said first oil pressure chamber, said spool valve body having a first pressure-receiving surface area facing said first oil pressure chamber, said piston having a second pressure-receiving surface area facing said second oil pressure chamber, said first pressure-receiving surface area being smaller than said second pressure-receiving surface area by a predetermined amount.

7. A direct-coupling control device as claimed in claim 5 or 6, wherein said gear trains of said auxiliary transmission includes first, second and third gear trains for providing low, medium and high speed reduction ratios, respectively, said direct-coupling control device including means for comparing said governor pressure with a first fluid pressure having a substantially zero value when said first or third gear train is selected, for supplying said second oil pressure chamber with the higher one of said governor pressure and said first fluid pressure, and comparing said governor pressure with a second fluid pressure having a predetermined value higher than said first fluid pressure when said second gear train is selected, for supplying said second oil pressure chamber with the higher one of said governor pressure and said second fluid pressure.

8. A direct-coupling control device as claimed in claim 1, further including timing means for temporarily interrupting the supply of said operating fluid pressure to said direct-coupling clutch during selecting operation of said selector means, to thereby temporarily release said mechanical engagement between said input member and said output member.

9. A direct-coupling control device as claimed in claim 1, further including valve means operable in response to a signal fluid pressure indicative of valve opening of a throttle valve of an engine installed in said automotive vehicle, wherein said valve means is adapted to interrupt the supply of said operating fluid pressure to said direct-coupling clutch when said signal fluid pressure indicative of valve opening of said throttle valve indicates an idle position of said throttle valve, to thereby release said mechanical engagement between said input member and said output member.

* * * * *

UNITED STATES PATENT AND TRADEMARK OFFICE
CERTIFICATE OF CORRECTION

PATENT NO. : 4,580,464

DATED : April 8, 1986

INVENTOR(S) : Masao Nishikawa, Takashi Aoki

It is certified that error appears in the above-identified patent and that said Letters Patent is hereby corrected as shown below:

Claim 3, Column 14, line 36: change "valve" to "value".

Signed and Sealed this

Nineteenth Day of August 1986

[SEAL]

Attest:

Attesting Officer

DONALD J. QUIGG

Commissioner of Patents and Trademarks